United States Patent
Olson et al.

(10) Patent No.: US 9,047,469 B2
(45) Date of Patent: Jun. 2, 2015

(54) MODES FOR APPLICATIONS

(75) Inventors: Jason R. Olson, Sammamish, WA (US); John M. Sheehan, Cambridge, MA (US); Christopher S. Dickens, Issaquah, WA (US); Benjamin A. Betz, Redmond, WA (US); Matthew S. Merry, Bellevue, WA (US); Rodger W. Benson, Seattle, WA (US); Ian H. Kim, Redmond, WA (US); Daniel J. Oliver, Seattle, WA (US); Elliot H. Omiya, Kirkland, WA (US); Timothy R. Sullivan, Redmond, WA (US); Scott Dart, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 13/229,701

(22) Filed: Sep. 10, 2011

(65) Prior Publication Data

US 2013/0067473 A1 Mar. 14, 2013

(51) Int. Cl.
*G06F 9/54* (2006.01)
*G06F 21/57* (2013.01)
*G06F 9/445* (2006.01)
*G06F 21/62* (2013.01)
*G06F 3/048* (2013.01)

(52) U.S. Cl.
CPC .............. *G06F 21/57* (2013.01); *G06F 9/445* (2013.01); *G06F 9/44505* (2013.01); *G06F 21/6218* (2013.01); *G06F 2221/2105* (2013.01); *G06F 2221/2119* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 6,492,985 B1 | 12/2002 | Mutz et al. | |
| 7,216,351 B1* | 5/2007 | Maes | 719/328 |
| 7,298,378 B1 | 11/2007 | Hagenbuch et al. | |
| 8,713,460 B2* | 4/2014 | Kendall et al. | 715/765 |
| 2003/0229900 A1* | 12/2003 | Reisman | 725/87 |
| 2005/0160371 A1* | 7/2005 | Karson et al. | 715/777 |
| 2008/0162262 A1 | 7/2008 | Perkins | |
| 2009/0222742 A1* | 9/2009 | Pelton et al. | 715/753 |

(Continued)

OTHER PUBLICATIONS

Edwards, et al., "MaPS: Movement and Planning Support for Navigation in an Immersive VRML Browser", Retrieved at <<http://www.mungbean.net/publications/maps.pdf>>, Proceedings of the second symposium on Virtual reality modeling language (VRML), Feb. 24-26, 1997, pp. 9.

*Primary Examiner* — Brian W Wathen
*Assistant Examiner* — Abdou Seye
(74) *Attorney, Agent, or Firm* — Jim Banowsky; Kate Drakos; Micky Minhas

(57) ABSTRACT

Techniques for modes for applications are described. In one or more implementations, multiple operational modes are provided for an application. The operational modes can be associated with different resource access permissions, trust statuses, graphical user interfaces, and so on. An application can be launched in a particular one of the operational modes based on a context in which a request to launch the application is received. In one or more implementations, correlations between launch request contexts for an application and operational modes can be configured to enable different launch requests to cause an application to launch into different operational modes.

20 Claims, 9 Drawing Sheets

(56) References Cited

U.S. PATENT DOCUMENTS

| | | |
|---|---|---|
| 2009/0254843 A1* | 10/2009 | Van Wie et al. ............... 715/757 |
| 2009/0289937 A1 | 11/2009 | Flake et al. |
| 2010/0058353 A1 | 3/2010 | Turski |
| 2010/0121810 A1 | 5/2010 | Bromenshenkel et al. |
| 2010/0299630 A1* | 11/2010 | McCutchen et al. ........... 715/803 |
| 2010/0313125 A1* | 12/2010 | Fleizach et al. ................ 715/702 |
| 2011/0247031 A1* | 10/2011 | Jacoby ............................ 725/25 |
| 2012/0081854 A1* | 4/2012 | Sirpal et al. .............. 361/679.22 |

* cited by examiner

MODES FOR APPLICATIONS

BACKGROUND

Today's computer user has access to a wide variety of applications, such as web browsers, media services, web applications, social media applications, and so on. These applications are typically associated with standard levels of access to various device resources. Further, each application may include a single user interface that can be implemented to enable interaction between a user and the application. Thus, currently available applications can be inflexible in terms of adapting to different device environments and operating scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for modes for applications are described. In one or more implementations, multiple operational modes are provided for an application. The operational modes can be associated with different resource access permissions, trust statuses, graphical user interfaces, and so on. An application can be launched in a particular one of the operational modes based on a context in which a request to launch the application is received.

In one or more implementations, correlations between launch request contexts for an application and operational modes can be configured such that different launch requests can cause an application to launch into different operational modes. For example, a user can specify that, for a particular launch request context, an application is to be launched into a particular operational mode.

In one or more implementations, the operational modes include an immersive mode and a desktop mode. The immersive mode can provide resource access permissions and other capabilities that are not available in the desktop mode. An application can launch into either the immersive mode or the desktop mode based on a context in which a request to launch the application is received.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for operational modes for applications are described. In one or more implementations, multiple operational modes are provided for an application. The operational modes can be associated with different resource access permissions, trust statuses, graphical user interfaces, and so on. An application can be launched in a particular one of the operational modes based on a context in which a request to launch the application is received.

In one or more implementations, correlations between launch request contexts for an application and operational modes can be configured to enable different launch requests to cause an application to launch into different operational modes. For example, a user can specify that for a particular launch request context, an application is to be launched into a particular operational mode.

In one or more implementations, the operational modes include an immersive mode and a desktop mode. The immersive mode can provide resource access permissions and other capabilities that are not available in the desktop mode, and vice versa. An application can launch into either the immersive mode or the desktop mode based on a context in which a request to launch the application is received.

In the following discussion, an example environment is first described that is operable to employ techniques for application operational modes described herein. Next, a section entitled "Immersive and Desktop Modes" describes example features of the immersive and desktop operational modes in accordance with one or more embodiments. Following this, a section entitled "Example Methods" describes some example methods in accordance with one or more embodiments. Next, a section entitled "Launch Context Scenarios" describes some example application launch contexts in accordance with one or more embodiments. Following this, a section entitled "Launch Context User Interface" describes a graphical user interface that may be employed to implement techniques discussed herein. Finally, an example system and device are described that are operable to employ techniques discussed herein in accordance with one or more embodiments.

Example Environment

Figure 1:
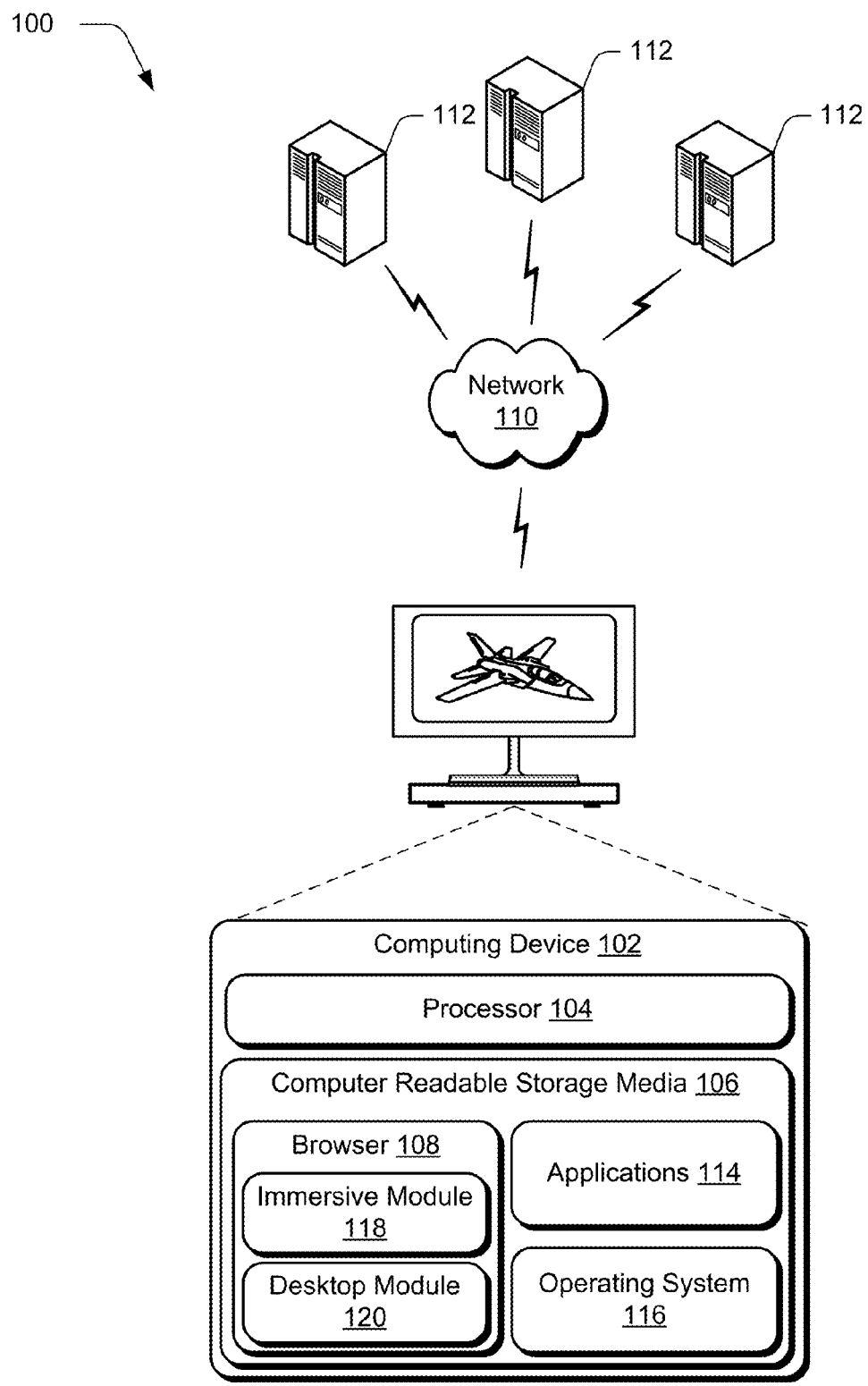
FIG. 1 is an illustration of an environment in an example implementation that is operable to employ techniques discussed herein.

FIG. 1 is an illustration of an environment 100 in an example implementation that is operable to employ techniques for operational modes for applications. Environment 100 includes a computing device 102 having one or more processors 104, one or more computer-readable storage media 106, and a browser 108 that resides on the computer-readable storage media 106 and which is executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 8 and 9.

The browser 108 is representative of functionality (e.g., a web browser) that is configured to navigate via a network 110 to access one or more web resources 112. Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks.

The browser 108, for instance, may be configured to navigate via the network 110 to interact with content available from the web resources 112 as well as communicate data to the one or more web resources 112, e.g., perform downloads and uploads. The web resources 112 may include any suitable computing resource that is configured to provide content that is accessible via the network 110. Examples of such content include web pages, text content, video, audio, and so on.

Also illustrated are one or more applications 114 which are stored on the computer-readable storage media 106 and which are executable by the processor 104. The applications 114 are representative of functionality to perform various tasks via the computing device 102, such as word processing, email, spreadsheet functionalities, and so on. The applications 114 may be configured to access the network 110, e.g., directly themselves and/or through the browser 108. For example, one or more of the applications 114 may be configured to access one or more of the web resources 112 to retrieve and/or upload content. Thus, the applications 114 may also be configured for a variety of functionality that may involve direct or indirect network 110 access. For instance, the applications 114 may include configuration settings and other data that may be leveraged locally by the application 114 as well as synchronized with applications that are executed on another computing device. In this way, these settings may be shared by the devices. A variety of other instances are also contemplated. Thus, the computing device 102 may interact with content in a variety of ways from a variety of different sources.

Further illustrated as part of the computing device 102 is an operating system 116 that is representative of functionality to manage resources of the computing device 102 and provide access to functionalities of the computing device 102.

Included as part of the browser 108 are an immersive module 118 and a desktop module 120, which are representative of functionalities of the browser 108 to execute in different operational modes. The immersive module 118 is representative of functionality of the browser 108 to operate in an "immersive" mode, and the desktop module 120 is representative of functionality of the browser 108 to operate in a "desktop" mode. There are functional and visual differences between the immersive mode and the desktop mode, which are discussed in more detail below. In implementations, the browser 108 is operable to launch into either or both of the immersive mode or the desktop mode via execution of a single executable file, e.g., "browser108.exe."

In one or more embodiments, the browser 108 can be configured as a "default browser" for the computing device 102. The default browser can be a default application that is invoked to handle hypertext transfer protocol ("http") and hypertext transfer protocol secure ("https") operations for the computing device 102. Designation as the default browser can enable the browser 108 to launch into the immersive mode, while other browsers or applications on the computing device 102 may be prevented from launching into the immersive mode. Thus, in at least some embodiments the computing device 102 can have a single default browser (e.g., the browser 108) that is permitted to launch into the immersive mode. In such embodiments, a request from a non-default browser to launch into the immersive mode can be denied.

To operate as the default browser for the computing device 102, the browser 108 can be registered with the operating system 116 as the default browser. For example, the browser 108 can be automatically registered as the default browser when the browser is installed on the computing device 102. Alternatively or additionally, the browser 108 can be registered as the default browser subsequent to being installed. In implementations, registration as the default browser can be implemented via a system component (e.g., the operating system 116) and/or via user selection of the browser 108 as the default browser. Although embodiments are discussed with reference to a single default browser, other embodiments may allow multiple browsers and/or applications to launch into the immersive mode and/or execute in the immersive mode simultaneously.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Immersive and Desktop Modes

As mentioned above, the immersive mode and the desktop mode can provide different functional and/or visual experiences in a browser environment. For example, the immersive mode enables a browser to interact with various functionalities of a computing device in a trusted manner to perform tasks and provide a unique user experience. The immersive mode is associated with a set of permissions that can enable the browser 108 to invoke privileged functionalities of the computing device 102, such as functions, methods, interfaces (e.g., system-level application programing interfaces (APIs)), and so on. For example, the immersive mode can enable the browser 108 to communicate with various entities as a trusted application, and thus access data and/or content that other applications are not permitted to access.

In addition, the immersive mode can be associated with various operational contracts with other functionalities, e.g., the operating system 116, other applications, and so on. A particular operational contract can specify a set of operating parameters and/or permissions that describe how interactions between the browser 108 and another functionality may occur. For example, an operational contract can specify particular interfaces that the browser 108 can access, methods that the browser may call, devices that the browser can communicate with, and so on.

The desktop mode presents a web browsing experience that enables a user to browse web pages and other content. The desktop mode, however, is not associated with the same access rights and permissions as the immersive mode. For example, when operating in the desktop mode, the browser 108 may not have access to functionalities of the computing device 102 (e.g., functions, methods, interfaces, and so on) that may be accessed via the immersive mode. Further, the desktop mode may not enable participation in some or all of the operational contracts that the immersive mode provides. In addition, the desktop mode may provide a set of capabilities, functionalities, and so on, that may not be accessed via the immersive mode.

In addition to the functional differences between the immersive mode and the desktop mode, visual differences between the modes may also exist. For example, the immersive mode can provide an immersive user interface with tiles that can be panned and/or scrolled via user gestures to access applications, content, and other resources. A graphical user interface presented in the immersive mode can be a full-screen interface that emphasizes a content-over-chrome approach such that controls and other "non-content" visuals are deemphasized. In contrast, the desktop mode can provide a window-based user interface that enables a user to navigate to websites and other content, e.g., using navigation controls displayed as part of the user interface.

While embodiments are discussed herein with reference to the immersive mode and the desktop mode, this is not intended to be limiting. For example, a variety of other operational modes can be employed for applications without departing from the spirit and scope of the claimed embodiments. The different operational modes can include different resource access permissions, operational contracts, security clearances, and/or graphical user interfaces such that each operational mode can provide a unique user experience, e.g., via a single application.

Further, while embodiments are discussed herein with reference to a browser operating in multiple modes, this is not intended to be limiting. For example, a wide variety of different applications (e.g., the applications 114) can be configured to operate in multiple modes, including but not limited to the immersive mode and the desktop mode.

Having described example aspects of the immersive mode and the desktop mode, consider now a discussion of some example methods in accordance with one or more embodiments.

Example Methods

Discussed below are a number of methods that may be implemented to perform techniques discussed herein. Aspects of the methods may be implemented in hardware, firmware, or software, or a combination thereof The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Figure 2:
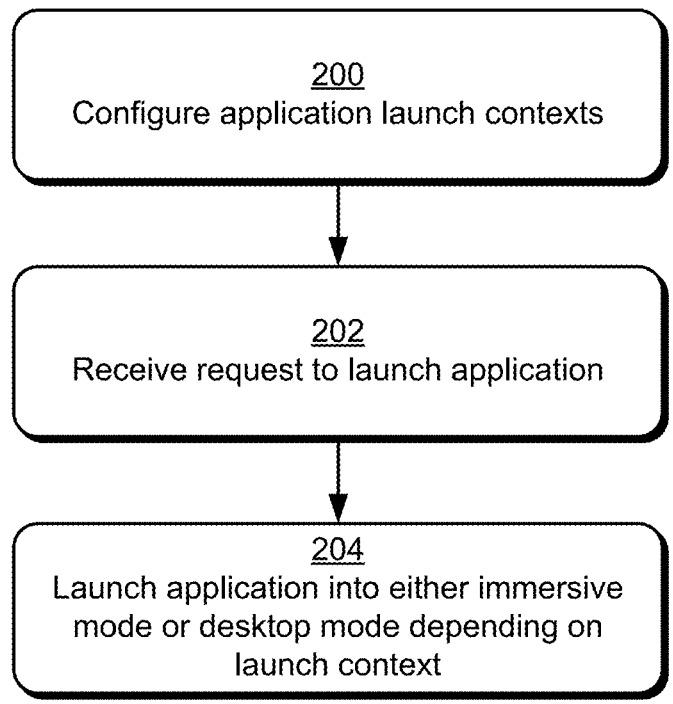
FIG. 2 is a flow diagram that describes steps in a method in accordance with one or more embodiments.

FIG. 2 is a flow diagram that describes steps in a method in accordance with one or more embodiments. Step 200 configures application launch contexts. For example, an application (e.g., the browser 108) can be configured to launch into either the immersive mode or the desktop mode, depending on the context in which the application was launched. The application launch contexts can be configured by an application developer, e.g., when the application is coded. Additionally or alternatively, application launch contexts can be configured by a user when the application is installed on a device.

Step 202 launches the application into either the immersive mode or desktop mode depending on a launch context. Examples of correlations between launch contexts and launch modes are discussed below.

Figure 3:
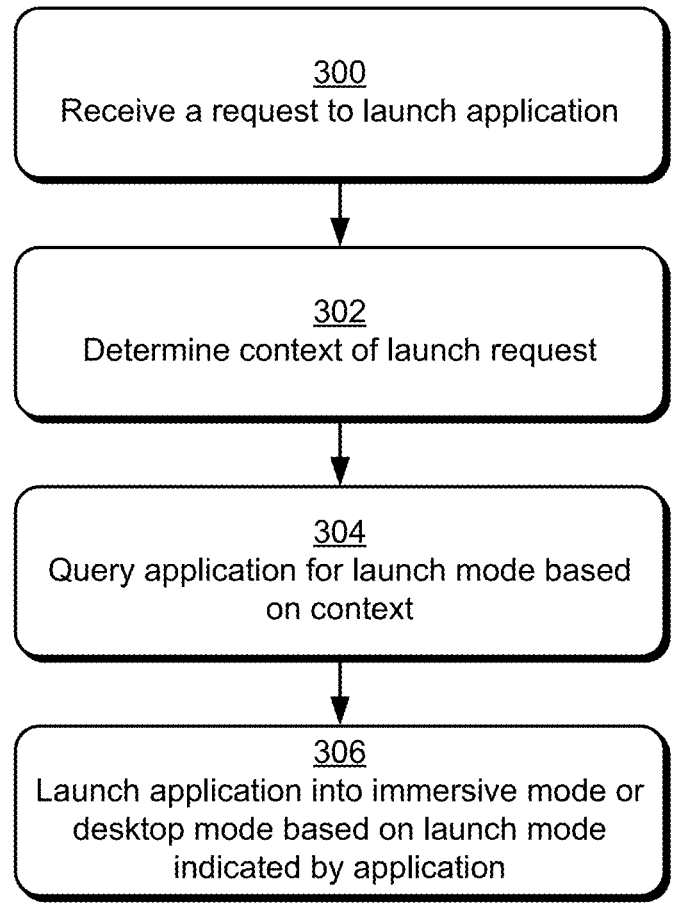
FIG. 3 is a flow diagram that describes steps in a method in accordance with one or more embodiments.

FIG. 3 is a flow diagram that describes steps in a method in accordance with one or more embodiments. Step 300 receives a request to launch an application. For example, a user can select a tile or an icon associated with the application to request that the application be launched. As another example, a user can select a hyperlink associated with a website or other web resource, which can generate a request to launch the application, e.g., the browser 108.

Step 302 determines a context for the launch request. For example, the context can be a user selection of a tile or icon, a user selection of a hyperlink, a request from another application to launch the browser 108, and so on. The context can also consider which mode the launch request was received in, e.g., the immersive mode, the desktop mode, or any other suitable operational mode. Step 304 queries the application for a launch mode based on the context. For example, the application can utilize a component object model (COM) object to receive and respond to requests for launch modes. An operating system or other functionality can forward information about a particular launch context to the COM object along with a query for the appropriate launch mode based on the context of the launch request.

Step 306 launches the application into the immersive mode or the desktop mode based on the launch mode indicated by the application. Example ways of launching an application into a particular mode are discussed below.

Figure 4:
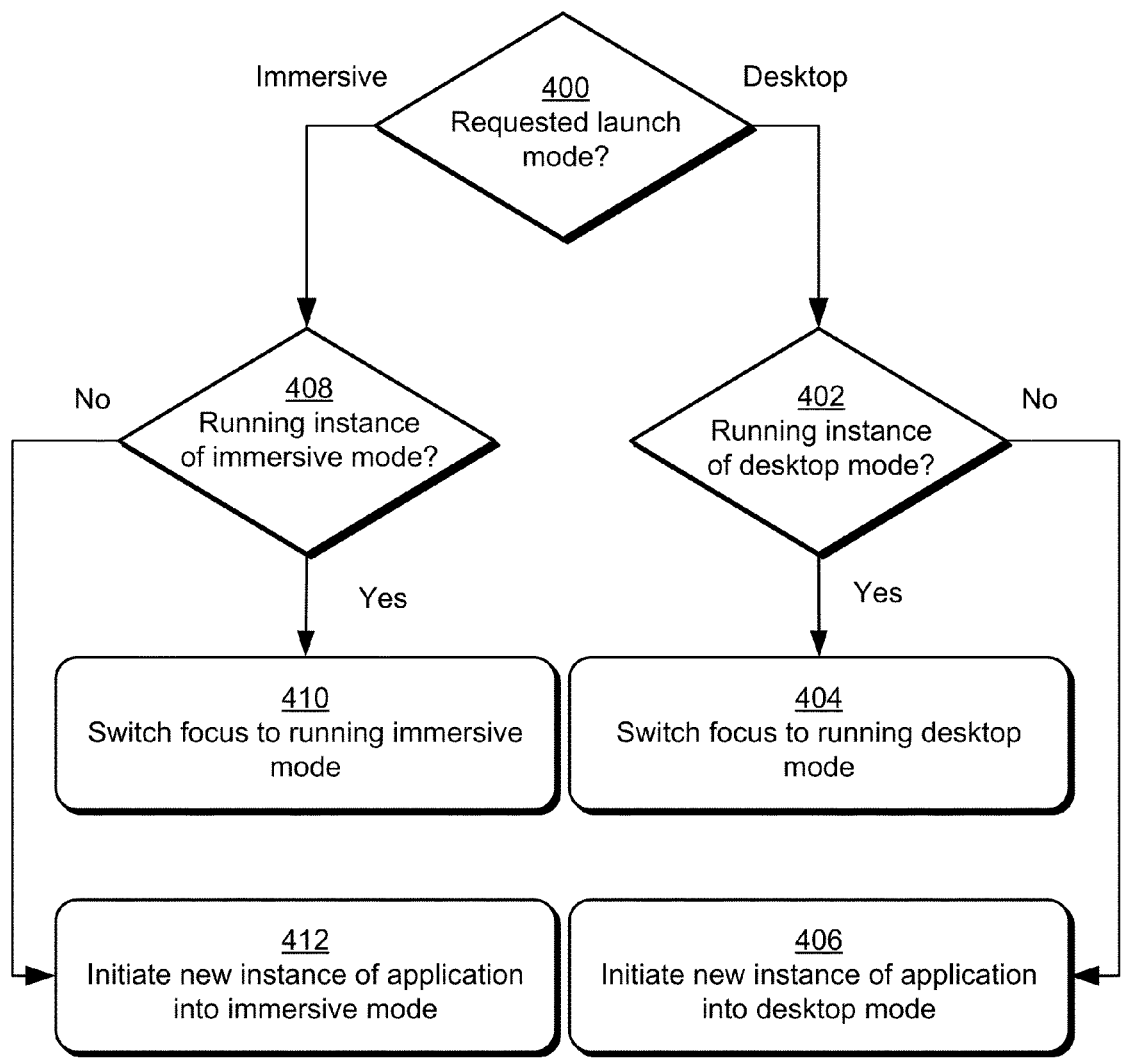
FIG. 4 is a flow diagram that describes steps in a method in accordance with one or more embodiments.

FIG. 4 is a flow diagram that describes steps in a method in accordance with one or more embodiments. In implementations, the method can be implemented to launch an application into a particular mode, e.g., a mode requested by the application or other entity. Step 400 determines a requested launch mode. For example, the operating system 116 can query the browser 108 with a particular launch context, and the browser can return a requested launch mode for the launch context.

If the application requests to launch in the desktop mode ("Desktop"), step 402 ascertains whether there is a running instance of the application in the desktop mode. If there is a running instance of the application in the desktop mode ("Yes"), step 404 switches focus to the running instance of the application in the desktop mode. For example, an instance of the browser 108 may have been previously launched in the desktop mode, and the previously-launched instance may still be active. The previously-launched instance can include an active browser window in the desktop mode, and the active browser window can be brought into focus in a display screen.

If there is not a running instance of the application in the desktop mode ("No"), step 406 initiates a new instance of the application into the desktop mode.

Returning to step 400, if the application requests to launch into the immersive mode ("Immersive"), step 408 ascertains whether there is a running instance of the application in the immersive mode. If there is a running instance of the application in the immersive mode ("Yes"), step 410 switches focus to the running instance of the application in the immersive mode. For example, an instance of the browser 108 may have been previously launched in the immersive mode, and the previously-launched instance may still be active. The previously-launched instance can include an active browser window in the immersive mode, and the active browser window can be brought into focus in a display screen. If there is not a running instance of the application in the immersive mode ("No"), step 412 initiates a new instance of the application into the immersive mode.

In implementations, a particular application can be configured to run in multiple modes at the same time, e.g., simultaneously. For example, a default application can have one window that is running in the immersive mode, and another window that is running in the desktop mode. Thus, techniques discussed herein can enable multiple instances of an application to be launched, with at least one instance running in a different mode than another instance.

Figure 5:
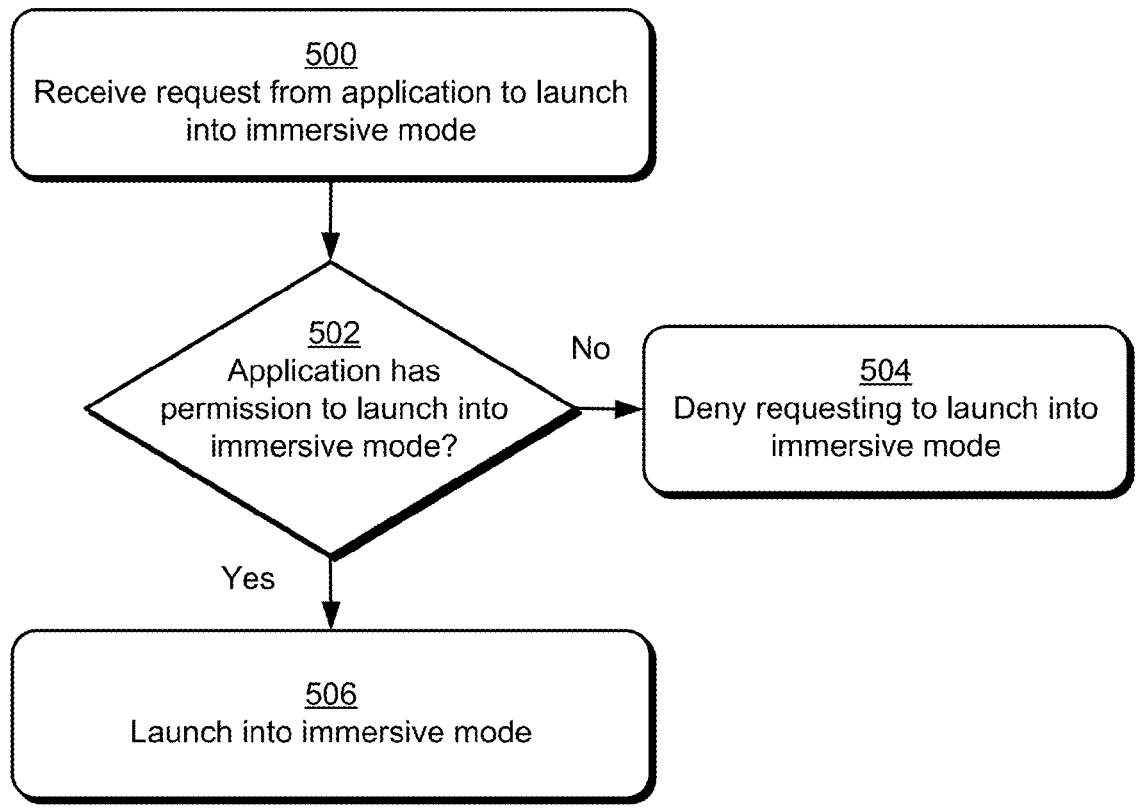
FIG. 5 is a flow diagram that describes steps in a method in accordance with one or more embodiments.

FIG. 5 is a flow diagram that describes steps in a method in accordance with one or more embodiments. In implementations, the method can be implemented in conjunction with step 400, discussed above with reference to FIG. 4. Step 500 receives a request from an application to launch into an immersive mode. For example, the operating system 116 can query the browser 108 as to which operating mode the browser is to launch into. The browser can return an indication to the operating system to launch the browser into the immersive mode.

Step 502 ascertains whether the application has permission to launch into the immersive mode. In implementations, different applications can have different permissions with respect to launching into the immersive mode. For example, as discussed above, a particular device can specify that a default browser is permitted to launch into the immersive mode, whereas other browsers and/or applications may not be permitted to launch into the immersive mode.

If the application does not have permission to launch into the immersive mode ("No"), step 504 denies the request to launch into the immersive mode. For example, if the application is not designated as the default application for running in both the immersive mode and the desktop mode, the application can be denied permission to launch into the immersive mode. In implementations, the application can fail to launch. Alternatively, the application can be launched into a mode other than the immersive mode, e.g., the desktop mode.

If the application does have permission to launch into the immersive mode ("Yes"), step 506 launches the application into the immersive mode. As discussed above, the application can be switched to a running instance of the immersive mode, or a new instance of the application in the immersive mode can be launched.

Figure 6:
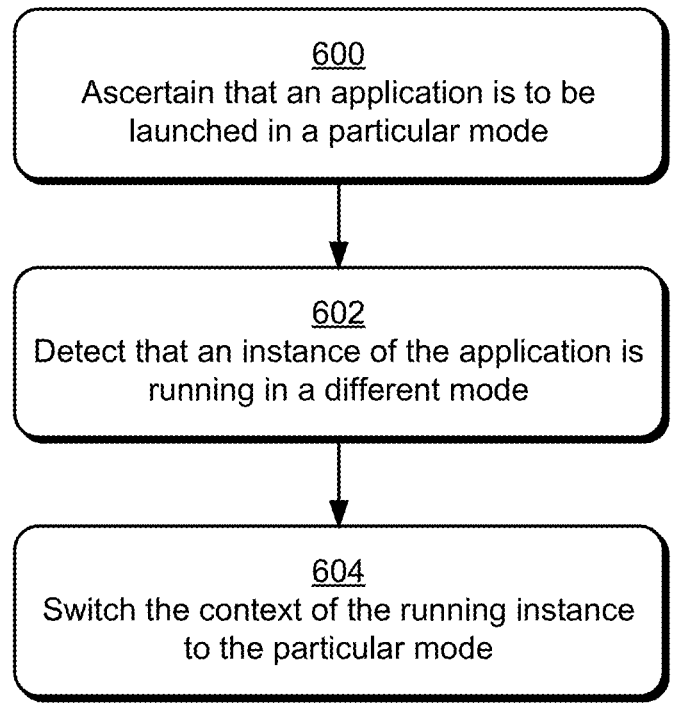
FIG. 6 is a flow diagram that describes steps in a method in accordance with one or more embodiments.

FIG. 6 is a flow diagram that describes steps in a method in accordance with one or more embodiments. In implementations, the method can be employed to switch a running application between different operational modes. Step 600 receives a request to launch an application in a particular mode. For example, an application can request to launch in one of the immersive mode or the desktop mode.

Step 602 ascertains that an instance of the application is running in a different operational mode. For example, the operating system 116 can determine that an instance of the application is running in a mode other than the particular requested mode. Step 604 switches the context of the running instance to the particular mode. For example, an instance of the application running in the desktop mode can be switched to the immersive mode, and vice versa.

Launch Context Scenarios

As discussed above, an application can launch into either the immersive mode or the desktop mode depending on the context in which the application is launched. Further, an application can be configurable such that a user can specify launch modes for a variety of launch contexts. The following is a discussion of some example launch contexts and some factors that may be considered for each context in determining which mode to launch into. These contexts and factors are presented for purposes of example only, and the claimed embodiments encompass a wide variety of different contexts and factors not expressly mentioned herein.

Tile and Icon Selection

An application can be launched in response to a user selection of a tile or an icon associated with the application. The term "tile" refers generally to a visually dynamic representation of an application that is selectable to access the application. A tile can include rich content, such as images, video, audio, animations, event notifications, and so on. The term "icon" refers generally to a visually static representation of an application that can be selected to access the application. In implementations, an application tile is generally associated with an immersive mode, and thus a user selection of a tile can cause an application to launch into the immersive mode. A user selection of an icon (e.g., an icon displayed on a user's desktop) can cause the application to launch into the desktop mode. For example, a selection of a browser icon can indicate that a user is invoking a web browsing functionality, and thus a web browser can be launched in the desktop mode to provide a web browsing experience.

Application Initiated Launch

In implementations, an application can be launched in response to a request from another application. For example, a content editing application may request that a web browser be launched to enable the content editing application to access a web resource, such as a content sharing site. In such embodiments, the mode in which the requested application launches can depend on the particular application that is requesting the launch. For example, an application developer for a requesting application can specify which mode should be invoked for the requested application. Further, an application developer for a requested application can specify which mode should be launched based on the particular application that is requesting the launch. Additionally or alternatively, a user can specify which launch mode should be implemented when a particular application is requesting that another application be launched. As yet another embodiment, an operating system or other functionality can provide an application with an indication of the mode in which the requesting application is executing. Thus, the application can launch into the same mode as the executing application, or a different mode, depending on how the application being launched is configured.

Link Selection Launch

In implementations, an application can be launched in response to a selection of a link, e.g., a hyperlink. For example, the web browser 108 can be launched when a user selects a link from another browser window, from an email message, and so on. The determination as to which operational mode the application will launch into can depend on a variety of factors associated with the link selection.

For example, the launch mode can be based on the context in which the link was selected, such as the application from which as user selected the link. If the user selected the link from an email or a website, the application can launch into the desktop mode to avoid potentially exposing sensitive functionalities that are invocable in the immersive mode to malicious content, e.g., malware. A link selected from a trusted document or website, however, may launch into the immersive mode. Further, a link selected from an application running in the immersive mode can launch another application and/or another window in the immersive mode.

Another factor that can be considered in link selection is the link itself, e.g., a resource that the link is pointing to. For example, if the link is pointing to an untrusted (e.g., potentially malicious) website, an application can be launched in the desktop mode in response to a selection of the link. As mentioned above, launching in the desktop mode can prevent sensitive functionalities of a computing device from being exposed to potentially harmful code.

Search-Based Launch

In implementations, an application can be launched in response to invoking a search functionality of a computing device. For example, a user can select a search icon or tile, which can cause an application to be launched that enables the user to search for various content and/or data. In implementations, a search-based launch can cause an application to launch into the immersive mode. Conducting a search in the immersive mode can provide a more comprehensive search experience by enabling the search to leverage the enhanced access rights and permissions afforded to the immersive mode. As with other launch scenarios, a search-based application launch is configurable by a developer and/or user to tailor specific search scenarios to appropriate application launch modes.

Launch Mode

The mode in which a request to launch an application is received can also be considered a launch context for purposes of determining which mode to launch the application into. For example, a selection of a link in an immersive mode can cause an application to launch into the immersive mode. Similarly, a selection of a link in a desktop mode can cause an application to launch into the desktop mode.

Launch Context User Interface

Figure 7:
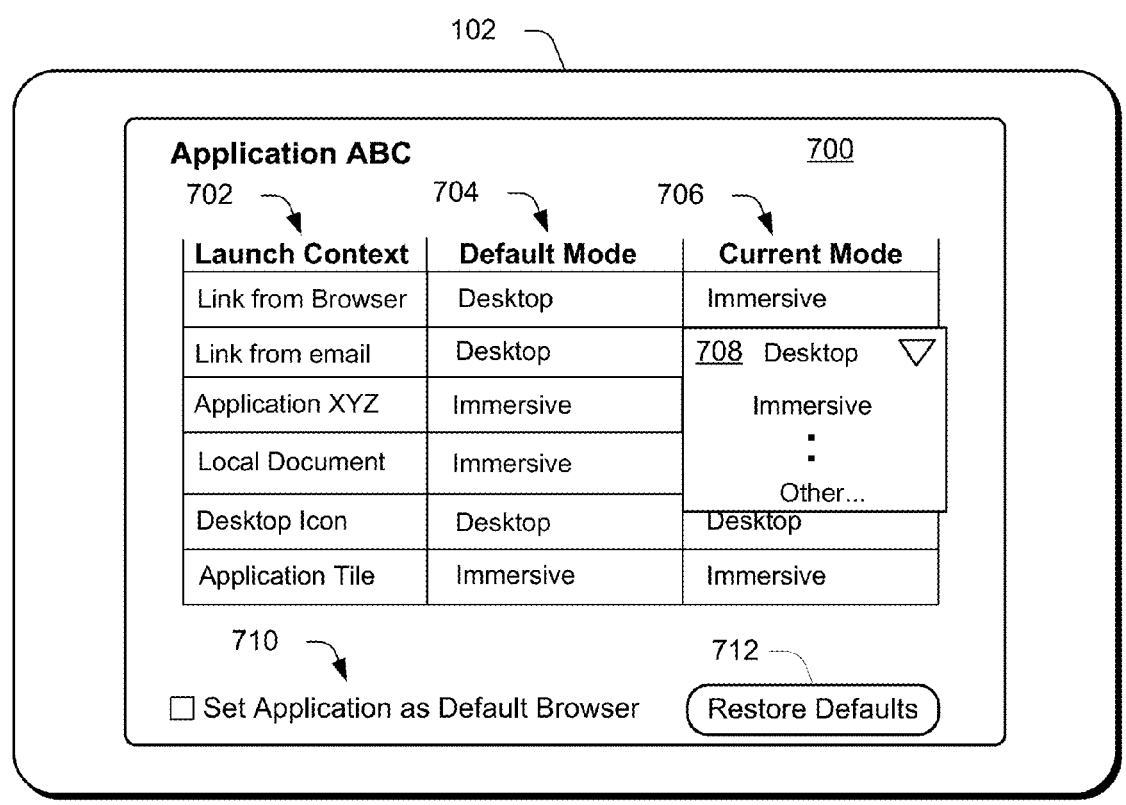
FIG. 7 illustrates an example launch context user interface in accordance with one or more embodiments.

FIG. 7 illustrates an example launch context user interface 700, in accordance with one or more embodiments. In implementations, the launch context user interface 700 can be displayed on the computing device 102 to enable a user to specify particular launch modes for specific launch contexts for an application.

Included as part of the launch context user interface 700 are a context region 702, a default region 704, and a current mode region 706. The context region 702 lists a variety of different launch contexts that may cause an application to be launched. The default mode region 704 lists a default launch mode for launch contexts listed in the context region 702. For example, an application developer can specify a default launch modes for different launch contexts.

The current mode region 706 lists current launch modes for launch contexts listed in the context region 702. For example, a user can change a launch mode for a particular launch context, such as via a launch mode menu 708. The launch mode menu 708 can be selected for different launch contexts (e.g., as a dropdown or other type of menu) to enable a launch mode to be specified for particular launch contexts. While some launch contexts are user-configurable, other launch contexts may be associated with a launch mode that cannot be changed by a user. For example, for data security or other reasons, a launch mode for a particular launch context may not be user-configurable.

Further included as part of the launch context user interface 700 are a default selector 710 and a restore defaults control 712. The default selector 710 can enable a user to select the application as a default browser for the computing device 102. Example implications of designation as a default browser are discussed above. The restore defaults control 712 can be selected to return launch context settings to their default launch mode, e.g., to the default launch modes listed in the default mode region 704.

In implementations, the launch context user interface 700 can be automatically presented when an application is first installed on a computing device to enable a user to set application launch modes, to set an application as a default browser, and so on. Additionally or alternatively, the launch context user interface 700 can be invoked by a user.

As discussed above, multiple applications may be eligible to be designated as a default browser. In some implementations, however, a system may enforce a policy that specifies that only a single application can be designated as a default browser at a given time. Thus, in such implementations, selecting an application as a default browser (e.g., using the default selector 710) can cause a default browser status of another application to be revoked.

Example System And Device

Figure 8:
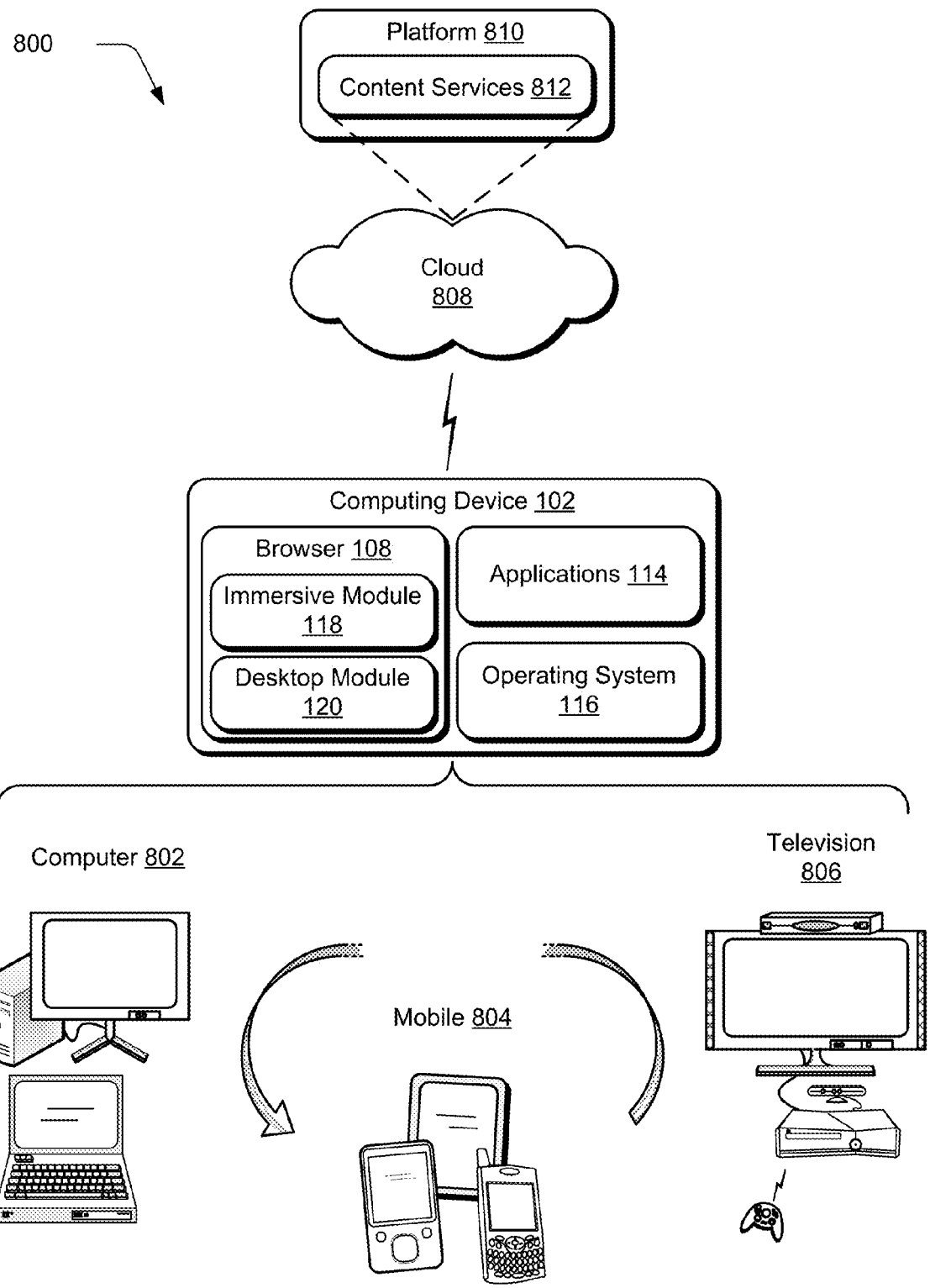
FIG. 8 illustrates an example system that includes the computing device as described with reference to FIGS. 1 and 9.

FIG. 8 illustrates an example system 800 that includes the computing device 102 as described with reference to FIGS. 1 and 9. The example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical attributes and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 802, mobile 804, and television 806 uses. Each of these configurations includes devices that may have generally different constructs and capabilities, and thus the computing device 102 may be configured according to one or more of the different device classes. For instance, the computing device 102 may be implemented as the computer 802 class of a device that includes a personal computer, desktop computer, a multi-screen computer, laptop computer, netbook, and so on.

The computing device 102 may also be implemented as the mobile 804 class of device that includes mobile devices, such as a mobile phone, portable music player, portable gaming device, a tablet computer, a multi-screen computer, and so on. The computing device 102 may also be implemented as the television 806 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 808 includes and/or is representative of a platform 810 for content services 812. The platform 810 abstracts underlying functionality of hardware (e.g., servers) and software resources of the cloud 808. The content services 812 may include applications and/or data that can be utilized while computer processing is executed on servers that are remote from the computing device 102. Content services 812 can be provided as a service over the Internet and/or through a subscriber network, such as a cellular or Wi-Fi network.

The platform 810 may abstract resources and functions to connect the computing device 102 with other computing devices. The platform 810 may also serve to abstract scaling of resources to provide a corresponding level of scale to encountered demand for the content services 812 that are implemented via the platform 810. Accordingly, in an interconnected device embodiment, implementation of functionality described herein may be distributed throughout the system 800. For example, the functionality may be implemented in part on the computing device 102 as well as via the platform 810 that abstracts the functionality of the cloud 808, as shown through inclusion of the various functionalities of the computing device 102.

Figure 9:
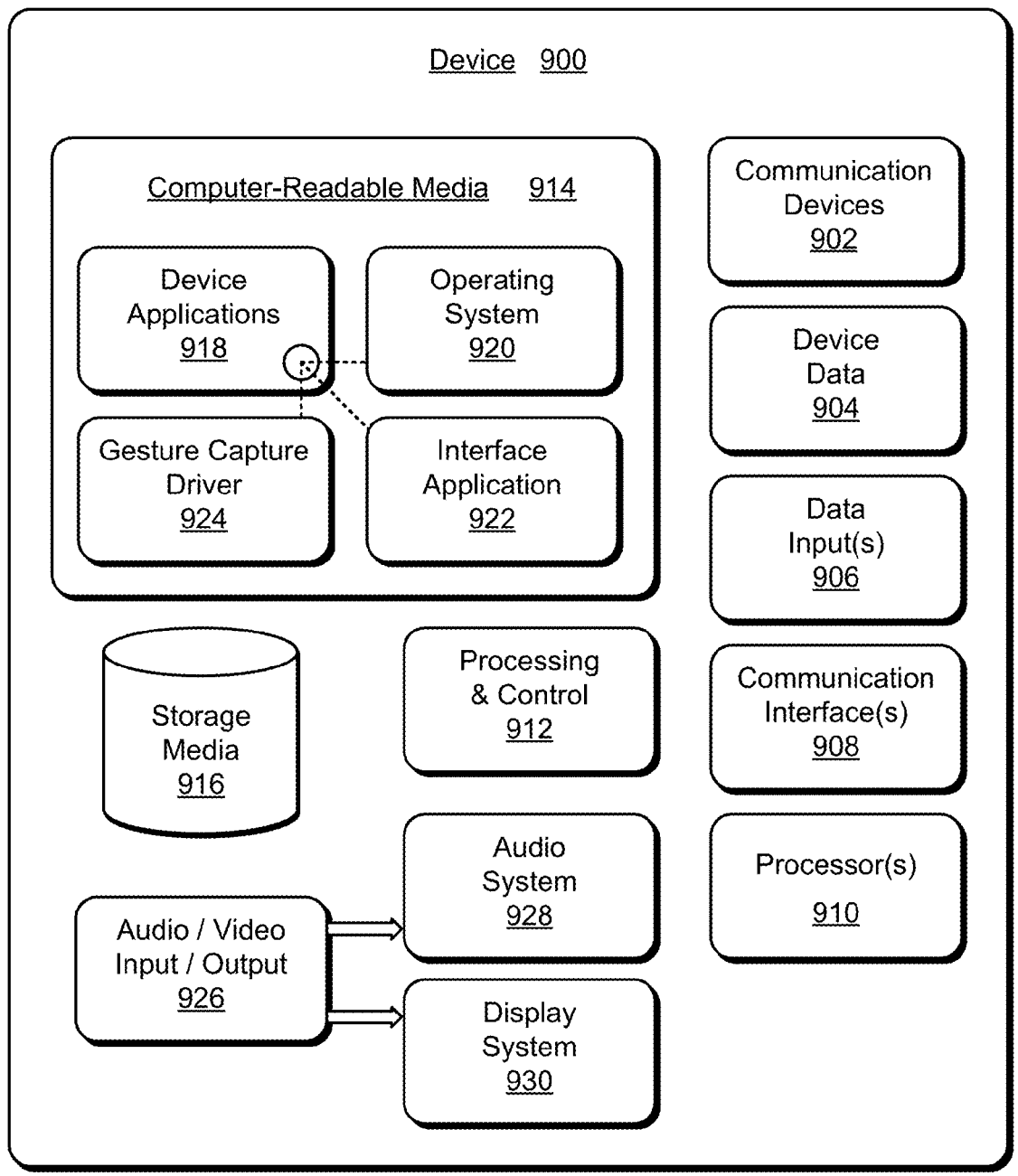
FIG. 9 illustrates various components of an example device that can be implemented as any type of portable and/or computer device as described with reference to FIGS. 1 and 8 to implement embodiments of the techniques described herein.

FIG. 9 illustrates various components of an example device 900 that can be implemented as any type of computing device as described with reference to FIGS. 1 and 8 to implement embodiments of the techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments of the techniques described herein. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the techniques described herein.

In this example, the device applications 918 include an interface application 922 and an input/output module 924 that are shown as software modules and/or computer applications. The input/output module 924 is representative of software that is used to provide an interface with a device configured to capture inputs, such as a touchscreen, track pad, camera, microphone, and so on. Alternatively or in addition, the interface application 922 and the input/output module 924 can be implemented as hardware, software, firmware, or any combination thereof. Additionally, the input/output module 924 may be configured to support multiple input devices, such as separate devices to capture visual and audio inputs, respectively.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Techniques for modes for applications are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media storing an application that is executable by a computing device, the application comprising:
   multiple operational modes including an immersive mode and a desktop mode, the multiple operation modes being implemented by modules including:
   an immersive module that is executable by the computing device to cause the application to execute in the immersive mode that enables the application to invoke particular functionalities of the computing device and to participate in operational contracts with other entities; and
   a desktop module that is executable by the computing device to cause the application to execute in the desktop mode that enables a user to browse content via the computing device but that is not permitted to invoke the particular functionalities or participate in the operational contracts associated with the immersive mode.

2. One or more computer-readable storage media as recited in claim 1, wherein the application is configured to operate in the immersive mode and the desktop mode via a single executable file.

3. One or more computer-readable storage media as recited in claim 1, wherein the particular functionalities comprise one or more of a function, a method, or an application programing interfaces (API).

4. One or more computer-readable storage media as recited in claim 1, wherein the immersive mode is associated with a different graphical user interface than the desktop mode.

5. One or more computer-readable storage media as recited in claim 1, wherein the application is configured to launch into either the immersive mode or the desktop mode based on a context in which a request to launch the application is received.

6. One or more computer-readable storage media as recited in claim 1, wherein the application is configured to execute in both the immersive mode and the desktop mode simultaneously.

7. One or more computer-readable storage media as recited in claim 1, wherein the application further comprises a graphical user interface that enables a user to specify, for one or more application launch contexts, which of the immersive mode or the desktop mode is to be used to initiate the application.

8. One or more computer-readable storage media as recited in claim 7, wherein the graphical user interface is configured to enable a user to designate the application as a default browser for the computing device such that other applications are prevented from launching into the immersive mode.

9. A computer-implemented method, comprising:
   receiving a request to launch an application via a computing device; and launching, via a single executable file for the application, the application by initiating a running instance of the application into either an immersive mode or a desktop mode based on a launch context ascertained from the request to launch, the immersive mode enabling the application to invoke a particular functionality of the computing device and to participate in an operational contract with another entity, and the desktop mode enabling a user to browse content via the computing device but that is not permitted to invoke the particular functionality or participate in the operational contract associated with the immersive mode.

10. A method as described in claim 9, wherein the application comprises a web browser, and wherein the launch context comprises a selection of a desktop icon for the web browser, a selection of a tile for the web browser, a selection of a hyperlink, or a request to launch the web browser from a different application.

11. A method as described in claim 9, wherein said launching comprises:
   determining that the application is requesting to be launched into the immersive mode;
   ascertaining whether there is a running instance of the application in the immersive mode on the computing device;
   if there is a running instance of the application in the immersive mode on the computing device, switching focus to the running instance; and
   if there is not a running instance of the application in the immersive mode on the computing device, initiating a new instance of the application in the immersive mode.

12. A method as described in claim 9, wherein said launching comprises:
   determining that the application is requesting to be launched into the immersive mode;
   ascertaining whether the application has permission to launch into the immersive mode;
   if the application has permission to launch into the immersive mode, allowing the application to launch into the immersive mode; and
   if the application does not have permission to launch into the immersive mode, preventing the application from launching into the immersive mode.

13. A method as described in claim 12, wherein if the application does not have permission to launch into the immersive mode, launching the application into the desktop mode.

14. A method as described in claim 9, wherein said launching comprises:
   ascertaining, based on the launch context, that the application is to be launched into one of the immersive mode or the desktop mode;
   detecting that an instance of the application is running in the other of the immersive mode or the desktop mode; and
   switching the instance of the application from the one to the other of the immersive mode or the desktop mode.

15. A system comprising:
   one or more processors; and
   one or more computer-readable storage media storing instructions that are executable by the one or more processors to perform operations including:
   determining a context of a request to launch an application on a computing device;
   querying the application for a launch mode based on the context of the request; and
   causing the application to be launched by initiating a running instance of the application into at least one of an immersive mode or a desktop mode on the computing device based at least in part on the launch mode indicated by the application, the immersive mode enabling the application to invoke a particular functionality of the computing device and to participate in an operational contract with another entity, and the desktop mode enabling a user to browse content via the computing device but that is not permitted to invoke the particular functionality or participate in the operational contract associated with the immersive mode.

16. A system as described in claim 15, wherein the immersive mode is associated with resource access permissions that are not available in the desktop mode.

17. A system as described in claim 15, wherein said causing comprises causing a first instance of the application to be initiated into one of the immersive mode or the desktop mode, and wherein the operations further include:
   receiving a different request to launch the application;
   ascertaining that the application is to be launched into a different one of the immersive mode or the desktop mode based on a context of the different request; and
   causing a second instance of the application to be initiated into the different one of the immersive mode or the desktop mode such that the first instance and the second instance are running in different modes simultaneously.

18. A system as described in claim 15, wherein the context of the request comprises one of a plurality of different launch request contexts, and wherein the application is configured to enable a user to specify that one of the immersive mode or the desktop mode be used for one or more of the different launch request contexts.

19. A system as described in claim 15, wherein the application comprises a web browser, and wherein the application is registered as a default browser for the computing device such that the application is permitted to run in the immersive mode while other applications are prevented from running in the immersive mode.

20. A system as described in claim 19, wherein the operations further include: determining that the application is requesting to launch in the immersive mode; and allowing the application to launch in the immersive mode responsive to ascertaining that the application is the default browser for the computing device.

* * * * *